Figure 1:
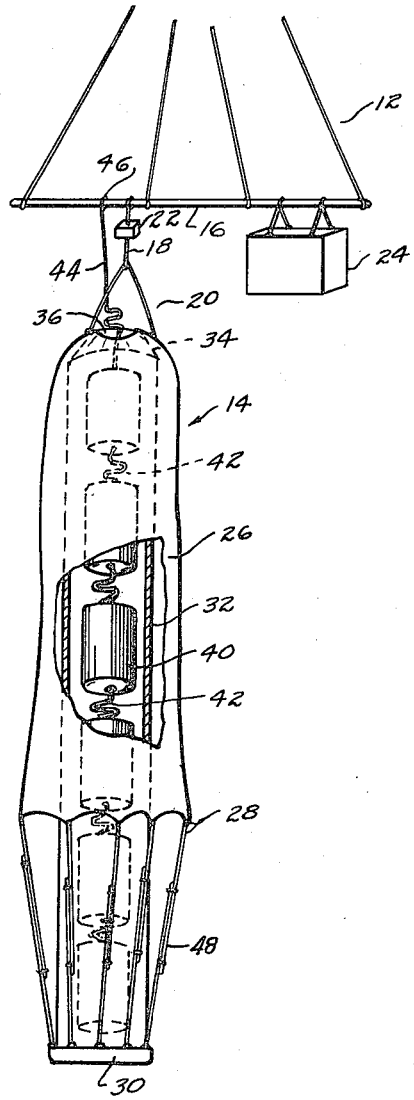

June 21, 1960  H. V. SMITH ET AL  2,941,750
BALLOON LOAD LAUNCHING DEVICE
Filed May 14, 1957

INVENTORS.
HAROLD V. SMITH
JAMES DWYER
JAMES A. WINKER
BY
ATTORNEYS

United States Patent Office 2,941,750
Patented June 21, 1960

2,941,750

BALLOON LOAD LAUNCHING DEVICE

Harold V. Smith, Manchester, Tenn., James Dwyer, Framingham, Mass., and James A. Winker, Sioux Falls, S. Dak., assignors to the United States of America as represented by the Secretary of the Air Force Filed May 14, 1957, Ser. No. 659,186

8 Claims. (Cl. 244—32)

(Granted under Title 35, U.S. Code (1952), sec. 266)

The invention described herein may be manufactured and used by or for the United States Government for governmental purposes without payment to us of any royalty thereon.

This invention relates to a method and apparatus for balloon-load-launching and, more particularly, to a device for launching load trains of instrument units of greater length than is presently thought possible.

In meteorological and geophysical research, large balloons have been used for carrying instruments and for simultaneously making measurements and obtaining data at different altitudes. Meteorological parameters and other physical data of research interest are obtained in this way, from trains of vertically spaced instruments attached to a balloon, and carried below it.

The present techniques for launching an instrument train is to stretch the line out on the ground with the instrument containers spaced at appropriate intervals and allow the ballon to pick up the instruments one by one as it rises. Under ideal conditions, the maximum length of load lines possible is 300–400 feet. With the use of applicant's device, it is now possible to use loads of 3,000 feet and over.

The optimum launching configuration is to have the load train as short as possible and as close to the balloon as possible.

The object of the present invention is to achieve this objective.

More specifically, the object of the invention is the provision of a system and apparatus for launching load trains compactly packed in a cylinder, which is held near the balloon in the initial launching process and later by means of a parachute device gradually providing a desired interval between the units of the load train.

A still further object of the invention is to provide a system of launching balloons with instrument load trains wherein the device, which initially carries the compacted units of the load train, is freed from the balloon and does not contribute a permanent dead weight.

A further object of the invention is the provision of means for distributing the falling force of compacted instrument trains during the process of decompacting or providing an interval between them.

A further object of the invention is the provision of a system for lifting an extremely long instrument load train in a compacted condition, severing the weight of the entire load from the balloon, supporting the entire load for an interval by means of a parachute, then returning the load, one unit at a time, back to the balloon.

A still further object of the invention is to simplify the launching of instrument load trains under any conditions, including high wind and other unfavorable conditions, and to provide a device for this purpose so simple as to preclude the possibility of malfunction.

Other objects and advantages will become apparent as the description proceeds.

In the drawing, Fig. 1 is a view of the device in the first stages of launching, showing the device partly in elevation and partly in cross section.

Figure 2:
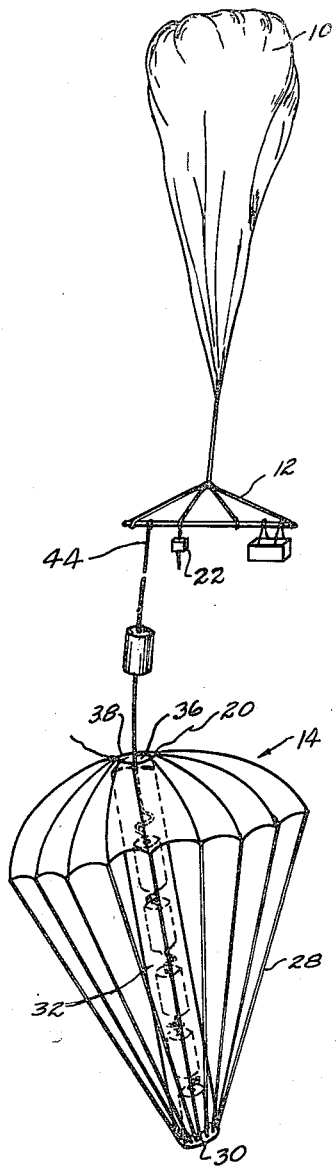

Fig. 2 is a schematic view of the launching device during a later stage of launching, showing the instrument units comprising the load train supported by a parachute and being doled back one by one and at spaced intervals.

Referring more particularly to the drawing, a balloon is shown schematically at 10 provided with a balloon rigging 12. A specially constructed parachute 14 is secured to a rod 16 of the balloon rigging 12 by means of a cord 18. The cord 18 and parachute bridle 20 are secured to the load 16 through a cut knife device 22. The cut knife device 22 is secured or is tied into the cord 18 and serves as a means of severing the parachute 14 from the balloon rigging 12. The cut knife device 22 may be a timed device or it may be of the aneroid type, the cutting being done when the balloon has reached a predetermined altitude. The cut knife device, however, may be of any expedient type. A special purpose instrument box 24 may serve also as a balance weight.

The parachute 14 is of a particular structure specifically designed for the present method of launching load trains. The canopy 26 is provided with shroud lines 28, which attach at their lower ends to a base 30. The base 30 may be weighted, if desired, to govern speed of fall. The base 30 constitutes the lower closure end of a cylinder 32. The upper end of the cylinder 32 is secured by cords or stitching or other means 34 into the upper portion of the canopy 26 and forms an inseparable part of it. The segments of the canopy 26 are gathered into a ring 38 providing a permanent opening at the apex.

In the packing of the device prior to launching, containers 40 are secured together by segments of cord 42 and packed into the cylinder 32. The length of the cord segments determines the ultimate spacing of the instrument units. The lengths of cord 42 must be carefully packed for successful deployment. Load trains of 3,000 feet and over have been packed into the cylinder in this fashion and have been successfully deployed.

The operation of the device is as follows: When the balloon is ready to be launched, the load train, comprising the containers, canisters, or other instrument units 40 and the connecting cords 42, is packed into the cylinder 32. The upper section of cord 44, secured to the topmost container, is tied, as shown at 46, to the rigging rod 16. The shroud lines 28 are folded back the overlapped portions being secured by elastic bands 48, which give way under weight and allow the shroud lines to attain their length. As the balloon ascends carrying the entire load, the cutting device 22 cuts the cord 18 at a predetermined altitude or time and the parachute falls away. As it descends, the parachute opens. The entire weight of the train is carried for an interval by the parachute. During the descent, the containers 40 leave the cylinder one by one and emerge through the opening at the apex of the canopy allowing the cords 42 to unfold so that the load train achieves its length. The weight of the instrument containers is transferred one by one back to the balloon rigging. When the last container has emerged through the apex, the parachute 14 is freed and floats away.

While the invention is shown and described in connection with one form for illustrative, rather than restrictive purposes, it is obvious that changes and modifications may be made by those skilled in the art without departing from the scope and spirit of the invention as defined in the accompanying claims.

We claim:

1. In an apparatus for launching balloon load-trains of connected and spaced instrument units, a balloon and balloon rigging, an assembly unit for lifting said load train in compacted condition comprising a parachute canopy provided with an apex opening, a container for supporting said load train in compacted condition secured to said parachute canopy in proximity to said apex opening, communicating therewith and forming an inseparable part of said parachute, shroud lines secured at one end to the skirt edge of said canopy and at the other end to the base of said container, a cord securing said parachute to said rigging, a cord extending through said apex opening and securing said load train to said rigging, an automatically controlled means for separating said first named cord from the balloon rigging at a predetermined point in the ascent of the balloon, for severing said parachute from said balloon rigging.

2. In a launching device for a balloon-load-train of connected and spaced instrument units, a parachute unit comprising a parachute canopy having an apex opening, a rigid container having an upper opening and a base, the periphery of said upper opening being attached to the periphery of said apex opening, shroud lines extending between the canopy skirt edge of said parachute and said base, a load train of instrument units attached in series by intervals of cord compacted in deployable condition in said container, a balloon rigging, means for attaching said load train to said rigging, said means extending through said apex opening, means for attaching said parachute to the balloon rigging, controlled means for detaching said last named means from said balloon rigging and freeing said parachute therefrom.

3. A parachute comprising a canopy and shroud lines, a support disposed below the canopy secured to the lower ends of said shroud lines, an elongated container extending between said support and the apex of the canopy, said container having a closed base and an upper opening, said upper opening coinciding with an opening through the apex of the canopy, and secured to the periphery of said opening, securing means for securing a fold in each shroud line when said canopy is not inflated, said means being releasable to allow said lines their full extent when said canopy is inflated.

4. A device for deploying trains of units spaced and connected together in series comprising a parachute, a container carried by said parachute and forming an integral part thereof, said parachute having an apex opening, said container having an upper open end coinciding with the apex opening in said canopy and secured to the periphery thereof, a closed base on said container, said base providing anchoring means for the shroud lines of said canopy, whereby the units of said load train may be compacted within said container and deployed in sequence through the apex of said canopy.

5. A system for launching balloon-load-trains comprised of instrument units connected by lengths of connecting cables, said system comprising a container, an upper open end on said container, a parachute canopy, an apex on said canopy secured to the periphery of said upper open end of said container, shroud lines secured at their upper ends to the skirt edge of said parachute canopy, and secured at their lower ends to the lower outer peripheral portion of said container, elements of a balloon-load-train compacted and carried within said container, parachute securing means for securing said parachute to the rigging of a balloon, means for securing said load train to the balloon rigging, means for severing said parachute securing means at a predetermined interval during the balloon's ascent, whereby said load train is lifted by the balloon in compacted condition and whereby said load train is decompacted gradually its weight being decreasingly sustained by the descending parachute, and finally being transferred to the balloon rigging when completely decompacted.

6. A system for launching balloon-load-trains comprised of instrument units connected by lengths of connecting cable, said system comprising means for attaching said balloon-load-train to the rigging of a balloon, means for compacting said load train and maintaining it in compacted condition, means for decompacting said load train at a desired time-altitude interval, means for decreasingly sustaining the weight of said balloon-load-train during the interval of decompacting and returning the weight of said balloon-load-train to said balloon rigging when the decompacting interval has been completed.

7. A parachute for use in launching balloon-load trains of connected and spaced units comprising a canopy provided with an apex opening, an elongated container for containing said load train in compacted condition during the ascent of the balloon, a closed lower end on said container, said container extending below the lower edge of said canopy when said canopy is in inflated condition, an open upper end on said container, said canopy being secured to the periphery of the upper open end of said container in the region of said apex opening for allowing the escape of said units, shroud lines attached to the skirt edge of said canopy, and secured at their outer ends to the outer periphery of the closed lower end of said container.

8. A balloon-load launching device comprising an elongated tubular container having an open upper end and a closed lower end, a plurality of rigid receptacles stacked in said container in end to end relation and supported on said closed lower end, flexible connector cable means connected between the adjacent ends of each pair of receptacles for connecting the containers in spaced end to end relation when withdrawn through the open end of said container, said connector cable means being compacted between each pair of said containers while in said receptacle, a parachute having an apex opening secured around the open end of said container for supporting said container when released from an elevated support such as a balloon, and a connection from the uppermost of said receptacles adapted to be permanently connected to the elevated support for withdrawing said receptacles from said container one by one to extend the connector cable means when the tubular container is released from the elevated support.

References Cited in the file of this patent

UNITED STATES PATENTS

| 1,793,729 | Askam | Feb. 24, 1931 |
| 2,640,666 | Cerrella | June 2, 1953 |
| 2,756,948 | Winzen | July 31, 1956 |

FOREIGN PATENTS

| 557,506 | France | May 5, 1923 |